Sept. 15, 1959　　　G. H. HANNON ET AL　　　2,903,793
DEVICE FOR PRESSING AND MOLDING PLASTIC FOOD PRODUCTS
EMPLOYING COOPERATING FORMING BLADES
Filed March 12, 1957　　　　　　　　　　　　　2 Sheets-Sheet 2

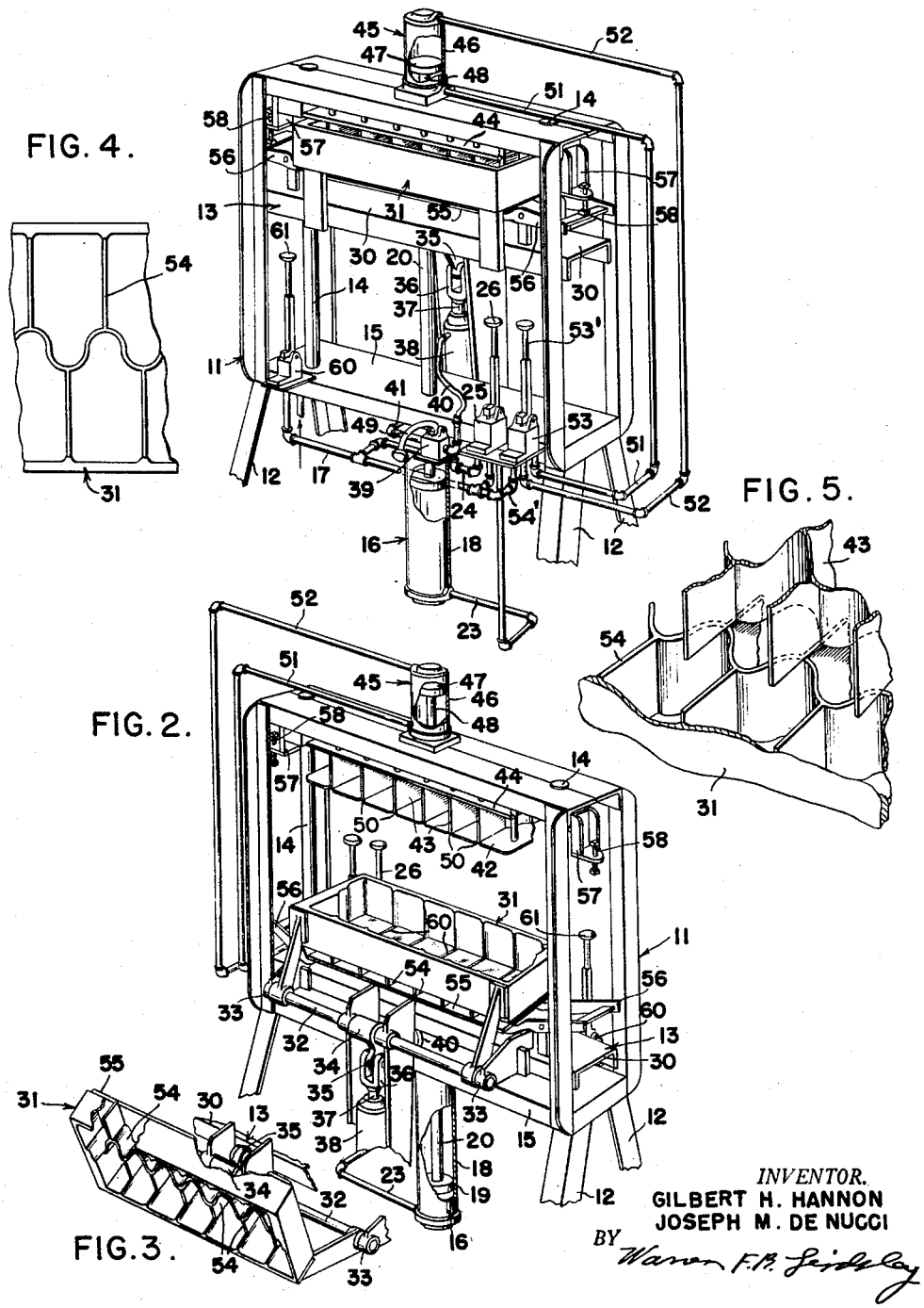

INVENTORS
GILBERT H. HANNON
JOSEPH M. DE NUCCI
BY
ATTORNEY

United States Patent Office 2,903,793
Patented Sept. 15, 1959

2,903,793

DEVICE FOR PRESSING AND MOLDING PLASTIC FOOD PRODUCTS EMPLOYING COOPERATING FORMING BLADES

Gilbert H. Hannon, Sheboygan, and Joseph M. De Nucci, Cumberland, Wis., assignors to L. D. Schreiber & Company, Inc., Green Bay, Wis.

Application March 12, 1957, Serial No. 645,462

8 Claims. (Cl. 31—30)

This invention relates to pressing and molding devices for plastic food products and more particularly to a new and improved pressing and molding device for forming blocks of cheese of substantially the same shape, size and weight.

Heretofore Scamorze cheese masses were formed by hand by kneading warm balls of curd until an enclosing skin wrapping formed around the cheese mass. This skin wrapping formed by the cheese completely covered the cheese mass thereby preserving the cheese from the deteriorating effects of the atmosphere. The demand for Scamorze cheese products has increased to the point where mass producing of blocks of skin covered cheese products of a constant weight is needed and demanded by the merchandiser.

Therefore, in accordance with the invention claimed, a new and improved cheese pressing and molding device is provided for forming blocks of skin covered cheese of substantially the same shape, size and weight from a given weight of cheese curd. The forming device comprises in combination a frame, means mounted on the frame for supporting an open container in which material is placed to be compressed and means for closing the container and compressing the material to cause the material to completely fill all corners of the forming device. A pair or plurality of pairs of cooperating forming blades are mounted on the frame for penetrating the container from opposite sides thereof to press the compressed material into a plurality of parts. Means are provided for actuating the pair of cooperating blades to penetrate the container. The blades press the material into masses of substantially the same size, shape and weight without rupturing the outer surface of the material. The blades are so arranged that they engage each other interior of the inside surface of the container to push the skin on the upper surface of the material against the skin on the lower surface of the material and thereby seal the upper and lower skin surfaces together at that point. The blades then rupture the very thin film at the center of the sealed surface to separate the masses, however, retaining an unruptured skin surface around each cheese mass.

It is, therefore, one object of the present invention to provide a new and improved pressing and forming device for plastic food products.

Another object of this invention is to provide a new and improved cheese pressing and molding device in which cheese masses of substantially the same shape, size and thickness are formed from a given body of cheese curd.

A further object of this invention is to provide a new and improved cheese pressing and molding device in which cheese curd is molded into a plurality of similar size masses without rupturing the skin formed around each individual mass.

A still further object of this invention is to provide a new and improved machine in which curd of a given weight is molded into a plurality of parts of a particular size and weight without rupturing the skin surrounding each part.

A still further object of this invention is to provide a new and improved cheese forming machine which utilizes cooperating forming blades which engage each other interior of the inside surfaces of a forming container.

Objects and advantages other than those above set forth will be apparent from the following description when read in connection with the accompanying drawings, in which:

Fig. 1 is a partial perspective view of a cheese pressing and molding device showing the movable platen in its upper position and embodying the invention;

Fig. 2 is a partial perspective view taken from another angle of the cheese pressing and molding device illustrated in Fig. 1 and showing the movable platen in its lower retracted position;

Fig. 3 is a partial perspective view of the cheese container rotated to the cheese discharging position;

Fig. 4 is an enlarged partial plan view of the cheese container and illustrating the shape of the forming blades;

Fig. 5 is an enlarged partial perspective view of the cooperating forming blades illustrated in Figs. 1 to 4, inclusive, with the cooperating blades spaced apart a short distance.

Figure 6:
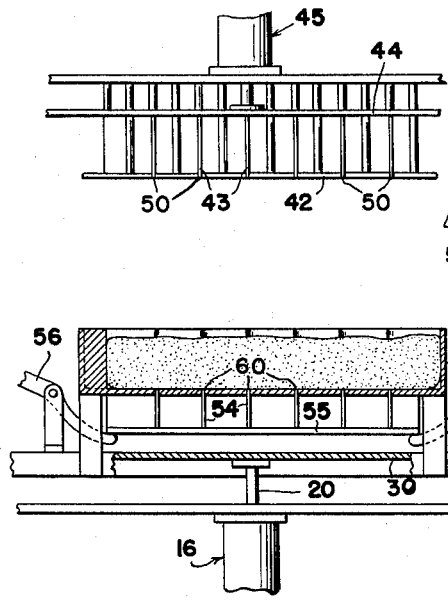
Figs. 6, 7 and 8 illustrate sequentially the cheese pressing and molding operations.

Referring more particularly to the drawings by characters of reference, Figs. 1 and 2 illustrate a machine for forming plastic food products such as Scamorze cheese comprising a frame 11 forming a plurality of legs 12, a ram actuated movable platen 13 reciprocally mounted on a pair of guide rods 14, and a shelf 15 arranged below the movable platen 13 for supporting an actuating means for the movable platen 13 such as fluid actuating means 16. The actuating means 16 is illustrated as a fluid motor actuable in two directions by fluid under pressure, which will be assumed herein to be compressed air, supplied from a suitable compressor (not shown) through pipes 17. Although the actuating means 16 is herein shown as a fluid motor, an electric motor with suitable reversing means or hand operated linkage may also be used.

The fluid motor 16 comprises a cylinder 18, piston 19 and piston rod 20. Cylinder 18 is provided with a pair of orifices which are connected by pipes 23 and 24, respectively, to a suitable valve 25. Valve 25, by means of a control handle 26, connects the source of fluid under pressure through pipes 17 to either pipes 23 or pipes 24 depending on the desired direction of operation of piston 19 and piston rod 20, as is well known in the art. Valve 25 may be connected through a muffler (not shown) to atmosphere so that when valve 25 connects cylinder 18, on one side of piston 19, of fluid motor 16, to the source of fluid under pressure it simultaneously connects cylinder 18 on the opposite side of piston 19 to atmosphere. Fluid motor 16 is arranged for rapid reversal action by draining the downstream side of cylinder 18 to atmosphere upon actuation of fluid motor 16.

Motor 16 is provided to reciprocate the movable platen 13 mounted on the pair of guide rods 14. The movable platen 13, shown as reciprocating vertically, may equally well be reciprocated in any other direction and comprises a base plate 30 suitably connected to piston rod 20 and an open container 31. Container 31 comprises a rectangular box like member which is fixedly mounted on a rod 32 which is rotatably mounted on movable platen 13. The ends of rod 32 are inserted in bearings 33.

Intermediate the ends of rod 32 is fixedly mounted a sleeve 34 which has fixedly attached thereto an apertured ear 35 which is pivotally mounted on a rod mounted between the arms of a U-shaped clamp 36. Clamp 36 is fixedly attached to the end of a piston rod 37 of a fluid motor 38. Motor 38 upon actuation in an upward direction (as shown in Fig. 2) rotates container 31 and its contents counterclockwise at least ninety degrees to dump its contents. Motor 38 is actuated by fluid under pressure from source 17 through a control valve 39 and supply pipes 40 and 41.

The movable platen 13 when actuated upward by fluid motor 16 moves container 31 upward until a press element 42 is engaged. The press element 42 is intended to fit snugly into container 31 so as to effectively close container 31 and compress the material, such as cheese curd placed therein, to fill all of the corners and cavities of container 31 upon a predetermined upward movement of platen 13. Movably mounted on frame 11 so as to extend within suitable openings 50 within the press plate or element 42 are a plurality of forming blades 43. Blades 43 are mounted on a base plate 44 which is reciprocally mounted on guide rods 14 and actuated by a fluid actuating means 45. The fluid actuating means 45 is illustrated as a fluid motor actuable in two directions by fluid under pressure such as compressed air supplied from a suitable compressor (not shown). Motor 45 may be an electric motor with suitable reversing means or hand operated linkage, if so desired.

The fluid motor 45 comprises a cylinder 46, piston 47 and piston rod 48. Cylinder 46 is provided with orifices which are connected by pipes 51 and 52 to a suitable fluid reversing valve 53. Valve 53 by means of control handle 53′ connects the source of fluid through pipes 17 and a pipe 54′ to either pipes 51 or 52, depending on the desired direction of operation of piston 47 and piston rod 48 as is well known in the art. Valve 53 connects the cylinder 46 of fluid motor 45 on either one side or the other of piston 47 to atmosphere through an exhaust opening (not shown) when the opposite side of cylinder 46 is supplied with fluid under pressure.

The piston 47 and piston rod 48 connected to base plate 44 actuates the forming blades 43 from their uppermost position shown in Fig. 2 wherein the edges of the blades 43 are flush with the lower surface of the press element 42 to their lowermost position shown in Fig. 1 where the edges of blades 43 engage cooperating blades 54 arranged to penetrate the bottom of container 31.

The base of container 31 is provided with a plurality of openings 60 for receiving blades 54. Blades 54 are mounted on a base plate 55 which is reciprocally mounted immediately below container 31 for actuating the blades into and out of container 31 upon predetermined actuation of the Scamorze cheese forming machine. As noted from Figs. 1, 2, 6, 7 and 8 of the drawings the base plate 55 is carried upward by the movement of platen 13 and container 31 upon the upward movement of piston rod 20 of motor 16. The base plate 55 is supported in its lower position by pairs of pivotally mounted rocker arms 56 mounted on movable platen 13 one at each end of the base plate 55. Rocker arms 56 are actuated to move the forming blades 54 into container 31 upon their engagement with extension arms 57 mounted one at each end of the base plate 42 supporting blades 43. When base plate 55 is not urged upward by the engagement of rocker arms 56 with extension arms 57 the base plate 55 and its cutting and forming blades 54 are moved to their lowermost position under the action of gravity.

If curd is placed in a container 31 and container 31 is actuated upward against press element 42 the curd is forced by press element 42 to completely fill all corners of container 31. While the curd is under pressure the movable blades 43 are actuated through the press element 42 by motor 45. Blades 43 if actuated to the bottom of container 31 would cut through the outer skin of the cheese and through the cheese curd. If this action occurred the mass of cheese curd then would be cut into a plurality of parts with the ruptured cheese mass exposing the inside portions of the curd to atmosphere.

Figure 8:
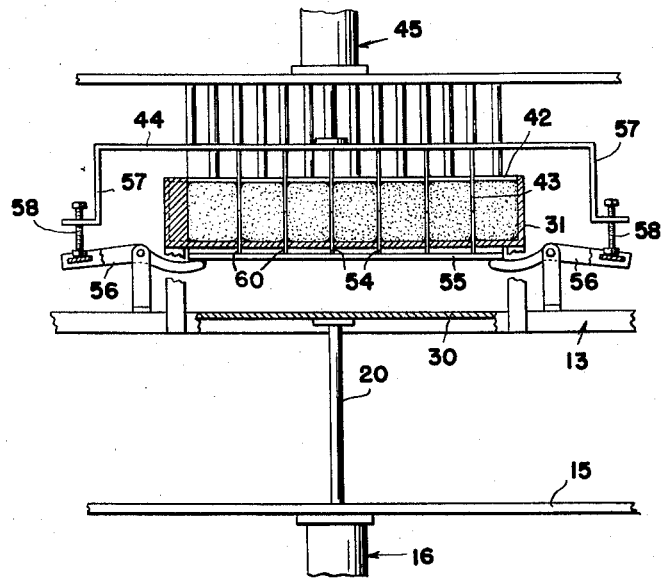

In accordance with the invention claimed a forming head is provided to press the curd placed in container 31 into a plurality of parts without rupturing the skin of the curd of each individual part. The forming head comprises the movable platen 13, the base plate 44 and the forming blades 43 acting in coordinate action with base plate 55 and forming blades 54. As the movable platen 13 and container 31 are moved upward, press element 42 closes container 31. Base plate 55 and blades 54 move upward but because of the action of gravity do not penetrate the base of container 31 until rocker arms 56 engage extension arms 57 of base plate 44. Base plate 44 is actuated downward to cause blades 43 to penetrate press element 42 after the press element has forced the cheese curd into all corners of container 31. By means of the adjustment bolt 58 arranged one at each end of extension arms 57 the time of movement of blades 43 fixed to base plate 44 and of blades 54 fixed to base plate 55 into container 31 are adjustable and controlled. As shown in Fig. 8 the blades 43 and 54 engage inside of the inside walls of container 31 to press the cheese curd into a plurality of parts without rupturing the outside skin of each individual part.

When the cooperating blades engage each other interior of the inside surfaces of container 31 the skin of the curd originally placed in container 31 is ruptured by the cooperating and engaging blades but the skin completely surrounding each indivdual loaf remains unruptured, thereby protecting the interior of each loaf or mass from atmospheric conditions. Fig. 4 is an enlarged plan view of the shape of the cutting blades while Fig. 5 is a partial perspective view of the cooperating cutting blades 43 and 54 about ready to engage each other during a cutting action.

In order to protect the operator's hands from being caught between the movable parts of the disclosed device a safety valve 60 comprising a hand operated means 61 is provided between the inlet pipes 17 and the source of fluid under pressure (not shown). The operator must use both hands to operate the pressing and molding device and thus cannot place his hands in the path of movement of the movable parts during actuation thereof.

In order to understand the invention claimed the following steps may be followed during use of the claimed device. A mass of cheese curd of a predetermined weight is placed within container 31. Upon rotation of handle 61 of valve 60 and a predetermined rotation of handle 26 of valve 25 fluid under pressure is forced through pipes 17, valve 25, pipes 23, and into cylinder 18 under piston 19. Simultaneously therewith fluid under pressure above piston 19 in cylinder 18 is exhausted through pipes 24 and valve 25 to atmosphere. The fluid under pressure actuates piston 19, piston rod 20, movable platen 13 and container 31 upward and into engagement with the press element 42. The pressure forcing piston 19 upward is of such a value that it presses the curd in container 31 against the press element 42 with such force that the curd completely fills all corners of the container 31.

At this time in the sequence of operation the operator moves handle 53′ of valve 53 downward and fluid under pressure from pipes 17 flows through pipe 54′, valve 53, pipe 52, and into cylinder 46 above piston 47. Simultaneously therewith fluid under pressure below piston 47 in cylinder 46 is exhausted through pipes 51 and valve 53 to atmosphere. The fluid under pressure actuates piston 47, piston rod 48, base plate 44 and forming blades 43 toward press element 42 and the forming blades 43 are actuated through the blade openings in the press element 42 against the curd of cheese. As the blades 43 press against the cheese curd the extension arms 57 are forced against the rocker arms 56. Rocker arms 56 are rotated causing base plate 55 to move upward and blades 54 to penetrate container 31 from the bottom thereof. As base plate 44 moves downward with blades 43, base plate 55 is moved upward with blades 54. This action continues until the cooperating blades engage each other interior of the inside surface of container 31 thereby pressing the skin of the upper surface of the cheese mass with the skin on the lower surface and then separates the masses formed by rupturing the skin of the seal to separate the masses from each other. The skin of the seal is ruptured in such a manner that each loaf or mass is completely wrapped by the skin of the original mass of cheese curd placed in container 31.

Upon deformation of the original mass of cheese curd into a plurality of smaller loaves or masses of cheese the operator moves handle 53' of valve 53 back up to its vertical position shown in Fig. 1. At this time the operator actuates the handle 26 of valve 25 to its vertical position shown in Fig. 1. Fluid under pressure then flows from pipes 17 through pipe 54', valve 53, pipe 51, cylinder 47 to the under side of piston 47. Piston 47 is actuated upward with the simultaneous exhausting to atmosphere of that part of cylinder 46 above piston 47 through pipe 52 and valve 53 to atmosphere. Simultaneously with the actuation of piston 47 and blades 43 upward piston 19 of fluid motor 16 is actuated to move the movable platen 13 and container 31 to their lower position shown in Fig. 2. Fluid flows from pipes 17 through valve 25, pipe 24, cylinder 18 to the upper side of piston 19 to accomplish this action.

When container 31 is in its lower position and the container is full of loaves or masses of cheese of equal size, shape and weight the container is rotated 180 degrees by pressing down on handle 49 of control valve 39. Upon the downward movement of spring biased handle 49 of control valve 39 fluid under pressure flows from the source through valve 60 underneath the piston of fluid motor 38 and forces the piston upward thereby moving piston rod 37 and the U-shaped clamp 36 upward. Upward movement of clamp 36 rotates sleeve 34 and rod 32 causing container 31 to rotate counterclockwise as shown in Fig. 2. In this manner the cheese loaves or masses may be dumped into a suitable container, salt bath or onto a conveyor as the situation may require. Fig. 3 illustrates the dumping position of container 31.

Figs. 4 and 5 illustrate the physical features of one form of cheese body formed by the structure shown and claimed in this invention. Although Fig. 5 illustrates cutting blades forming Scamorze shaped cheese bodies, this invention is not limited to any particular given shape or size of cheese.

Figure 7:
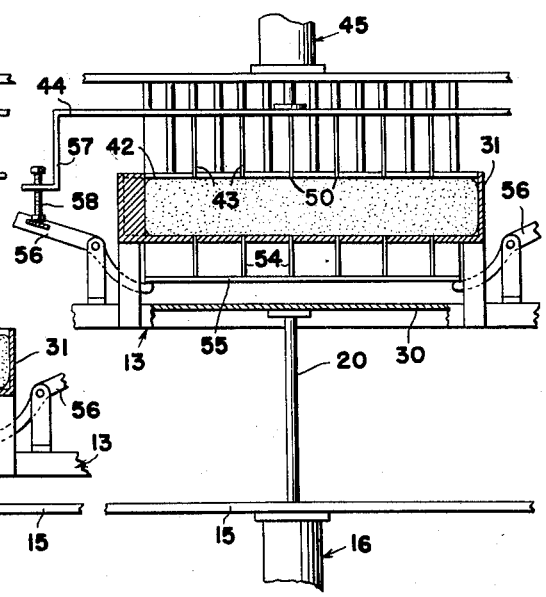

Figs. 6 to 8, inclusive, show the various phases of the cheese mass forming operations. Fig. 6 shows the container 31 being actuated upward toward the press element 42. The mass of cheese curd of a predetermined weight has been placed in the container. Fig. 7 shows the position of container 31 as the mass of cheese curd engages the press element 42. In Fig. 7 the forming plates are just starting to penetrate through the press element and the extension arms 57 have just engaged the rocker arms 56. In Fig. 8 the forming blades 43 and 54 have been pressed into the mass of cheese curd to blade engagement without rupturing the outer skin of the cheese mass before forming the individual Scamorze shaped blocks.

This new and improved cheese pressing and forming device presses a plurality of cheese masses of any desired shape out of a larger mass of cheese curd while retaining the outer skin wrapping of the original cheese mass around each individual cheese loaf. These attractively formed cheese products all of the same size and weight may be shipped to a retailer in individual packages. In mass merchandising of cheese, this is a time and money saving feature over the prior art.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. A pressing and molding device comprising in combination a frame, means mounted on said frame for supporting an open container in which material is placed to be compressed, means mounted on said frame adjacent said container for closing said container and compressing the material into a predetermined shape, a pair of cooperating forming blades mounted on said frame for penetrating said container and moving toward each other from opposite sides of said container to press the compressed material into a plurality of parts, and means mounted on said frame for actuating said pair of cooperating forming blades to penetrate said container and move toward each other, said blades pressing into the material until said cooperating forming blades engage each other interior of the inside surface of said container.

2. A pressing and molding device comprising in combination a frame, means mounted on said frame for supporting an open container in which material is placed to be compressed, means mounted on said frame adjacent said container for closing said container and compressing the material into a predetermined shape, a pair of cooperating forming blades mounted on said frame for penetrating said container and moving toward each other from opposite sides of said container to press the compressed material into a plurality of parts, means mounted on said frame for actuating one of said pair of blades to cause it to penetrate said container, said actuating means for said one of said pair of blades upon movement thereof actuating said other of said pair of blades to cause it to penetrate said container, said blades pressing into the material without rupturing the outer surface thereof until said blades engage each other interior of the inside surface of said container.

3. A pressing and molding device comprising in combination a frame, means mounted on said frame for supporting an open container in which material is placed to be compressed, a press element mounted on said frame adjacent said container, means mounted on said frame for actuating said container toward said press element to close said container and compress the material into a predetermined shape, a pair of cooperating forming blades mounted on said frame for penetrating said container and moving toward each other from opposite sides of said container to press the compressed material into a plurality of predetermined shaped parts, a first means comprising a fluid motor mounted on said frame for actuating one of said pair of blades to penetrate said container from one side thereof, and a second means mounted on said frame and actuated by said first means for simultaneously actuating the other of said pair of blades to penetrate said container from another side thereof, said blades pressing into the material without rupturing the outer surface thereof until the cooperating blades of said pair of blades engage each other interior of the inside surface of said container.

4. A pressing and molding device comprising in combination a frame, a movable platen mounted on said frame, an open container in which material is to be compressed and formed mounted on said platen, a press element mounted on said frame, means for actuating said movable platen toward said press element to close said container and compress the material into a predetermined shape, a pair of relatively movable cooperating forming blades mounted on said frame, one of said pair of blades being arranged to penetrate through said press element and into said container and the other of said pair of blades being arranged to penetrate through the base of said container and into said container, said blades upon penetration into said container pressing the compressed material into a plurality of parts, and means mounted on said frame for actuating said one of said pair of blades through said press element and into said container, said actuating means for said one of said pair of blades substantially simultaneously upon movement thereof actuating said other of said blades through said base, said blades pressing into the material without rupturing the outer surface thereof until said blades engage each other interior of the inside surface of said container.

5. A pressing and molding device comprising in combination a frame, a movable platen mounted on said frame, an open container in which material is to be compressed and formed mounted on said platen, a press element mounted on said frame, fluid motor means mounted on said frame for actuating said platen toward said press element to close said container and compress the material into a predetermined shape, a pair of engaging forming blades mounted on said frame, one of said pair of blades being arranged to penetrate through said press element and into said container and the other of said pair of blades being arranged to penetrate through the base of said container to the interior thereof, said blades upon penetration into said container pressing the compressed material into a plurality of parts, means mounted on said frame for actuating said forming blades to penetrate into said container, said blade actuating means comprising a motor having a cylinder and piston, said piston actuating said one of said pair of blades through said press element, and a lever arm pivotally mounted on said frame for actuating said other of said blades through said base of said container, said lever arm being actuated by said motor upon said piston moving said one of said pair of blades through said press elements, said blades pressing into the material without rupturing the outer surface thereof until said blades engage each other interior of the inside surfaces of said container.

6. A pressing and molding device comprising in combination a frame, a ram actuated movable platen mounted on said frame, an open container in which material is to be compressed and formed mounted on said platen and comprising a base member having a plurality of blade openings, a press element mounted on said frame, said press element being provided with a plurality of blade openings, means mounted on said frame for actuating said movable platen toward said press element to cause said press element to close said container and compress the material into a predetermined shape, a first forming head mounted on said frame, said first forming head comprising a first group of forming blades arranged to extend through said openings in said press element and into said container, a second forming head movably mounted on said base member and comprising a second group of forming blades arranged to extend through said openings in said base member and into said container, means mounted on said frame for causing said first group of forming blades to penetrate said container when closed by said press element, and a lever arm pivotally mounted on said frame for actuating said second group of forming blades toward and through said base member and into said container, said lever arm being actuated by said first group of forming blades upon movement through said press element, said first and second groups of blades engaging each other interior of the inside surface of said container to press the material into a plurality of predetermined parts.

7. A pressing and molding device comprising in combination a frame, a ram actuated movable platen mounted on said frame, an open container in which material is to be compressed and formed mounted on said platen and comprising a base member having a plurality of blade openings, a press element mounted on said frame, said press element being provided with a plurality of blade openings, means mounted on said frame for actuating said movable platen toward said press element to cause said press element to close said container and compress the material into a predetermined shape, a first forming head mounted on said frame, said first forming head comprising a first group of forming blades arranged to extend through said openings in said press element and into said container, a second forming head mounted on said frame adjacent said base member and comprising a second group of forming blades arranged to extend through said openings in said base member and into said container, means mounted on said frame for actuating said first group of forming blades to penetrate said container when closed by said press element, said blade actuating means comprising a motor having a cylinder and piston, said piston actuating said first group of forming blades through said press element and into said container, and a lever arm pivotally mounted on said frame for actuating said second group of forming blades through said base member and into said container, said lever arm being actuated by said first group of forming blades during movement through said press element, said first and second groups of blades engaging each other interior of the inside surface of said container to press the material into a plurality of predetermined shapes.

8. A pressing and molding device comprising in combination a frame, a ram actuated movable platen mounted on said frame, an open container in which material is to be compressed and formed mounted on said platen and comprising a base member having a plurality of blade openings, a press element mounted on said frame, said press element being provided with a plurality of blade openings, fluid motor means mounted on said frame for actuating said movable platen toward said press element to cause said press element to close said container and compress the material into a predetermined shape, a first forming head mounted on said frame, said first forming head comprising a first group of forming blades arranged to extend through said openings in said press element and into said container, a second forming head mounted on said frame adjacent said base member and comprising a second group of forming blades arranged to extend through said openings in said base member and into said container, means mounted on said frame for actuating said first and second groups of forming blades when said container is closed by said press element to penetrate said container, said blade actuating means comprising a motor having a cylinder and piston, said piston actuating said first group of forming blades through said press element and into said container, a lever arm pivotally mounted on said frame for actuating said second group of forming blades through said base member and into said container, said lever arm being actuated by said first group of forming blades during movement through said press element, said first and second groups of blades engaging each other interior of the inside surface of said container to press the material into a plurality of predetermined parts without rupturing the outer surface of each individual part, and means mounted on said frame for rotating said container at least ninety degrees for dumping said parts out of said container after a forming operation.

References Cited in the file of this patent
UNITED STATES PATENTS

| 447,187 | Hull | Feb. 24, 1891 |
| 1,859,762 | Blum | May 24, 1932 |
| 2,054,720 | Cederholm | Sept. 15, 1936 |
| 2,618,227 | Schmittroth | Nov. 18, 1952 |
| 2,711,585 | Bush | June 28, 1955 |

FOREIGN PATENTS

| 20,619 | Great Britain | 1902 |